Figure 1:
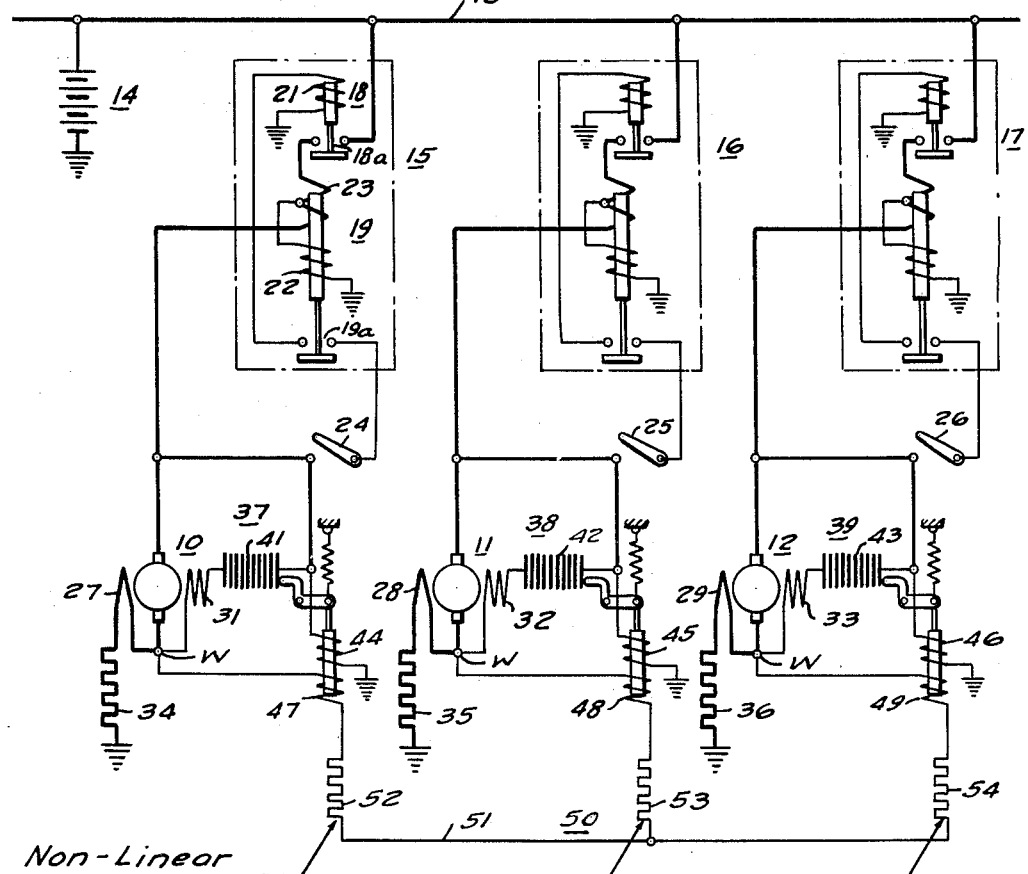

Jan. 10, 1950

R. J. LUSK 2,494,397

ELECTRIC GENERATING SYSTEM

Filed Oct. 7, 1947

Non-Linear Resistance

WITNESSES:
E. A. M'Closkey
New. C. Groome

INVENTOR
Robert J. Lusk.
BY
G. D. Crawford
ATTORNEY

Patented Jan. 10, 1950

2,494,397

UNITED STATES PATENT OFFICE 2,494,397

ELECTRIC GENERATING SYSTEM

Robert J. Lusk, Pittsburgh, Pa., assignor to Westinghouse Electric Corporation, East Pittsburgh, Pa., a corporation of Pennsylvania Application October 7, 1947, Serial No. 778,445

7 Claims. (Cl. 171—312)

My invention relates, generally, to electric generating systems and, more particularly, to direct current power generating systems embodying a plurality of parallel operated direct current generators provided with voltage regulators electrically interconnected to effect load division between the generators.

In the operation of such generating systems, particularly on aircraft for providing auxiliary power, the generators are individually driven by the aircraft engines which operate over a wide speed range. It is important to obtain proper load balance or division under all operating conditions, regardless of the number of generators that are being operated or which are effective. On systems of this kind, one or more of the aircraft engines may be operated at idling speed or at such speed that the voltage regulator associated with the generators is not effective. Load division between generators is obtained by electrically connecting the regulators which are provided with paralleling windings by means of an equalizer circuit. The paralleling windings are energized in accordance with the load currents of the generators and the system functions to effectively divide the total load in the desired manner so long as all of the generators, or all the generators which are connected to the load, are operated within the speed range wherein their regulators are effective to control their output voltages. It has been found, however, that when one generator is slowed down below this predetermined range, the equalizer current flowing in the equalizer connections between the regulators of the several generators becomes excessively large which results in an excessive lowering of the system voltage. The flow of equalizer current under a condition of this kind is such as to cause the regulator of the generator which is slowed down and reduced its load to attempt to regulate to maintain the proper load on that generator, and the regulators on the other generators are caused to tend to reduce the increased loads of their respective generators. This results in a reduction in the system voltage whereas it is desired to maintain a predetermined voltage on the load bus, regardless of the operating condition of any one of the connected generators.

Accordingly, it is the object of my invention, generally stated, to provide for so controlling the equalizer current under such conditions as to prevent excessive lowering of the voltage on the load bus.

A more specific object is to provide, in a system of a character described, for preventing excessive equalizer current by utilizing a non-linear ballast resistance in the equalizer circuit which connects the regulators of the several generators.

Another object of my invention is to provide for preventing the flow of excessive equalizer current in a system of the character described by connecting a non-linear resistance in the form of an incandescent lamp in series with each of the paralleling windings of the voltage regulators.

Figure 2:
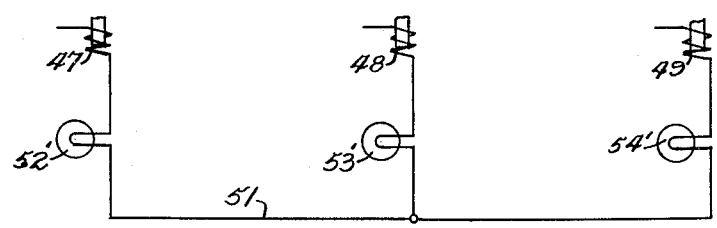

These and other objects of my invention will become more apparent from the following detailed description of a specific embodiment of the invention when read in conjunction with the accompanying drawing, in which:

Figure 1 of the drawing is a diagrammatic view of a power generating system of the type commonly employed on aircraft for providing auxiliary power embodying the principal features of my invention, and Fig. 2 is a similar view of a modification of the system of Fig. 1.

Referring to Figure 1 of the drawing, there is shown a plurality of direct current generators 10, 11 and 12 for supplying power to a load bus 13 to which a battery 14 also may be connected. In this instance the positive terminals of the generators are connected to the load bus through relay switches 15, 16 and 17, respectively, and the negative terminals of the generators are connected to a common ground through their commutating field windings, as will be referred to in more detail hereinafter.

The relay switches 15, 16 and 17 are of well known construction and are illustrative of any suitable switch device of this general type for controlling the connection of the generators to the load bus. In this instance, they each comprise a main contactor and a reverse current relay.

Considering relay switch 15, for example, it comprises a main contactor 18 and a reverse current relay 19. The main contactor 18 is provided with an operating winding 21 and the reverse current relay with a main operating winding 22 and a series holding winding 23. The latter winding is connected in series circuit relation with the positive terminal of the generator and the contact members 18a of the main contactor to the load bus 13.

The main operating winding 22 of relay 19 is for the purpose of operating or closing this relay in response to a predetermined generator voltage. The holding winding 23 is cumulatively wound with respect to the main winding 22 so that it functions in response to reverse current flow to open the relay 19. The other relay switches 16 and 17 may be of similar construction and, therefore, a detailed description thereof is not necessary.

Each generator is provided with a manual control switch identified by the numerals 24, 25 and 26. These switches are selectively operable to render the main contactors responsive to the operation or closure of the reverse current relays 19. It will be understood that, when switch 24, for example, is closed, an operating circuit for the operating winding 21 of the main contactor 18 is set up, which may be completed by the closure of contact members 19a of the reverse current relay.

The generators 10, 11 and 12 may be individually driven by the engines of the aircraft (not shown) over a comparatively wide speed range of from zero to full speed. As each generator which has been rendered effective by the closure of its associated control switch develops the required voltage, it is connected to the load bus 13 by the operation of its associated relay switch.

The generators are provided with commutating field windings 27, 28 and 29 and shunt field windings 31, 32 and 33, respectively. The commutating field windings may be connected in series circuit relation with the negative generator terminals and load resistors 34, 35 and 36, respectively, to ground. These load resistors may be separate resistance elements or they may be considered as illustrative of the resistance in the negative load connection of the generator. The negative generator lead or the commutating field winding itself may inherently provide sufficient resistance. In this instance, however, separate resistance elements have been indicated in order to illustrate that the negative generator lead has resistance.

The generators are also provided with voltage regulators 37, 38 and 39, respectively, which function in a well known manner to control the excitation of the shunt field windings 31, 32 and 33 to maintain a substantially constant voltage over a predetermined operating range.

These regulators are shown as carbon pile regulators although any other suitable type may be used. The carbon pile resistance elements are indicated by the numerals 41, 42 and 43, shown as connected in series circuit relation with their associated shunt field windings across the generator armatures. The regulators are also provided with main operating windings 44, 45 and 46 and paralleling or equalizer windings 47, 48 and 49.

As shown, the main operating windings are connected between the positive terminal of the generators and ground so as to be subjected to the generator voltages. The paralleling windings 47, 48 and 49 function when connected in an equalizer circuit indicated generally at 50 to control the division of load between the several generators by modifying the action of the regulators.

As shown, each of the paralleling windings have one terminal connected to a negative terminal of its associated generator, and the other terminals are connected to a common equalizer bus 51. This is in effect a bridging circuit which functions to control the regulators in accordance with the loads on their associated generators in such manner as to maintain a predetermined load division. It will be apparent that, in this instance, the paralleling windings are subjected to voltages dependent upon the voltage drops in the negative connections to ground of all the generators which are connected to the load bus.

It is to be understood, however, that the paralleling windings may be connected at other points in the negative connections of the generators to ground so long as they are subjected to an adequate voltage drop which is proportional to their load currents.

This general arrangement has been found to function satisfactorily when the generators are all being operated within their normal operating range in which event the voltage regulators function to properly regulate the voltage of their associated generators and maintain the desired load division. However, when the speed of a generator is reduced to idling speed or to some speed lower than the predetermined range within which its regulator is effective in maintaining proper voltage, load division will not be properly maintained.

This is due to the fact that under such conditions the lowered voltage results in unequal load division with the idling generator taking less than its share of the total load.

As an example let it be assumed that generator 10 has been slowed down and generators 11 and 12 are still operating within their normal speed range. The flow of equalizer current is of such direction in the paralleling winding 47 as to tend to cause the regulator 37 to increase the generator voltage, but since this regulator has been rendered ineffective due to the lowered generator voltage, this increased flow of equalizer current will not be effective. The flow of equalizer current through the other paralleling windings 48 and 49, however, will be such as to cause the regulators 38 and 39 to reduce the voltages of their associated generators. This causes the system voltage to be reduced, whereas it is desired to maintain this voltage at the proper value.

In order to correct this adverse condition, my invention provides for preventing the flow of excessive equalizer current by utilizing non-linear resistors 52, 53 and 54 in the equalizer circuit. More specifically, these resistors may be connected in series circuit relation with each one of the paralleling windings 47, 48 and 49. Any suitable type of resistance element may be used for this purpose so long as it is of the non-linear type with the proper characteristic for the circuit involved. I have found it to be advantageous to use an incandescent lamp for this purpose as shown in Fig. 2, which is a partial view of the system of Fig. 1.

The use of a resistance element of this kind in the equalizer circuit does not reduce the equalizer current appreciably under normal operating conditions, that is, at normal generator load differences. For abnormal differences in generator load, the response of the non-linear resistance element is such as to effectively control the equalizer current to prevent excessive lowering of the bus voltage by limiting the flow of equalizer current in the paralleling windings of the regulators on the generators which are still operating within their normal speed range.

In view of the foregoing, it will be apparent that I have provided in a very simple and economical manner for improving the operation of systems of the character described. The use of non-linear resistance elements in the form of incandescent lamps or otherwise in the equalizer circuit between the several parallel connected generators results in a system having greatly improved voltage stability over the systems of the prior art. The system is also rendered more flexible as it is possible to maintain adequate voltage on the load bus, regardless of the fact that the speed of one or more of the several connected generators may be reduced below the normal operating range.

While I have described a specific object of my invention, it is to be understood that this embodiment is illustrative only and that the invention may be performed in other ways. In addition, while the invention has been described as it may be applied to a power system for aircraft, it is to be understood that it may also be applied to power systems for other purposes.

I claim as my invention:

1. In combination, a plurality of direct current generators adapted to be individually driven by separate prime movers for supplying power to a common load, voltage regulators individual to each generator operable in response to the voltages of their respective generators to control the excitation thereof and thereby the voltage of the generators within a predetermined speed range thereof, said regulators having electrically interconnected auxiliary windings effective to cause the regulators to maintain a predetermined division of the total load between the generators, and non-linear resistors individual to each regulator disposed in the electrical connections therebetween in series circuit relation with the auxiliary windings, said resistors functioning to limit the flow of equalizer current between the auxiliary windings of the regulators when anyone of the generators is operating below said predetermined speed range, thereby to prevent an excessive drop in the system voltage under such conditions.

2. In combination, a plurality of direct current generators adapted to be driven over a relatively wide speed range from idling speed to full running speed of a prime mover and connected in parallel circuit relation to a common load bus or circuit, a voltage regulator individual to each generator for controlling the excitation thereof, said regulators having paralleling windings, an equalizer circuit including said paralleling windings connecting the generators, and a non-linear resistance connected in series circuit relation with each of said paralleling windings, said resistances functioning to limit the flow of equalizer current in the paralleling winding of the regulator of any generator of which the speed is reduced to below a predetermined value.

3. In combination, a plurality of direct current generators for supplying power to a common load, voltage regulators individual to the generators for controlling the excitation thereof, said regulators having main operating windings connected to be responsive to generator voltage and paralleling windings, a common equalizer bus connecting corresponding terminals of the paralleling windings, and a non-linear resistance element connected in series circuit relation with each paralleling winding, said resistance elements functioning as a ballast resistor in the equalizer circuit of regulators to limit the equalizer current under wide generator speed differences.

4. In combination, a plurality of direct current generators adapted to be individually driven over a relatively wide speed range by individually connected engines for supplying power to a common load, said generators having series and shunt field windings, a voltage regulator individual to each generator responsive to generator voltage and operable to control the excitation of the shunt field winding and thereby the voltage of the generator, said regulators being provided with paralleling windings, an equalizer circuit including a common equalizer bus connecting the paralleling coils of the regulators together, and a non-linear ballast resistor connected in series with each of the paralleling windings in the equalizer circuit, thereby to provide for limiting the equalizer current when one or more of said generators are operating at low speed to limit the equalizer current and thus prevent low system voltage under such low speed conditions.

5. In combination, a plurality of direct current generators adapted to be individually driven over a wide speed range by a plurality of prime movers for supplying electrical power to a load bus, control means individual to each generator for selectively connecting said generators to the load bus, a voltage regulator individual to each generator operable to regulate the generator voltage over a predetermined speed range, said regulators having main operating windings responsive to the voltage of their associated generators and auxiliary or paralleling windings, circuit means connecting said paralleling windings in parallel relation between a common equalizer bus and ground through the negative lead circuits of their associated generators, whereby the paralleling windings of the regulators are caused to modify the action of the main operating coils of the regulators and maintain a desired division of load between the generators, and a non-linear resistance element connected in series circuit relation with each paralleling winding, said resistance elements functioning to limit the flow of equalizer current when the speed of any one of the generators is reduced below the speed range within which its regulator is effective to regulate the voltage, thereby to prevent excessive reduction of the system voltage resulting from the flow of excessive equalizer current.

6. In combination, a plurality of direct current generators having shunt field windings adapted to be individually driven by separate prime movers for supplying power to a common load, a voltage regulator individual to each generator for controlling the voltages thereof within a predetermined speed range, said regulators having current varying elements connected to control the energization of the shunt field windings, main electro-responsive operating elements connected to be responsive to generator voltage and auxiliary electro-responsive operating elements, an equalizer circuit including said auxiliary electro-responsive operating elements interconnecting the generators, and non-linear resistance elements in the form of incandescent lamps connected in series circuit relation with each auxiliary electro-responsive operating element, thereby to limit the flow of equalizer current in the equalizer circuit to the regulator of any generator that is operating below said predetermined speed range.

7. In combination, a plurality of direct current generators having shunt field windings adapted to be individually driven by separate prime movers for supplying power to a common load, a voltage regulator of the carbon pile type individual to each generator for controlling the voltage thereof within a predetermined speed range, said regulators having main operating windings connected to be responsive to the voltages of their respective generators and cooperating paralleling windings, an equalizer circuit including a common equalizer bus connecting the paralleling windings together, each of said paralleling windings being connected at one terminal thereof to the negative terminal of its associated generator and at the opposite terminal to the common equalizer bus, and a non-linear resistance device in the form of an incandescent lamp connected in series circuit relation with each of the paralleling windings between their said opposite terminals and the common equalizer bus, thereby to limit the flow of equalizer current to the regulator of any generator which is operating below the speed range in which its regulator is effective to control its voltage.

ROBERT J. LUSK.

REFERENCES CITED

The following references are of record in the file of this patent:

UNITED STATES PATENTS

| Number | Name | Date |
|---|---|---|
| 1,786,311 | McDonald | Dec. 23, 1930 |